United States Patent
Kumaraswamy (10) Patent No.: US 11,108,781 B2
(45) Date of Patent: Aug. 31, 2021

(54) SYSTEMS AND METHODS FOR MANAGING DEVICE PRIVILEGES

(71) Applicant: Huntington Bancshares Incorporated, Columbus, OH (US)

(72) Inventor: Sekar Nalli Kumaraswamy, Lewis Center, OH (US)

(73) Assignee: HUNTINGTON BANCSHARES INCORPORATED, Columbus, OH (US)

( * ) Notice: Subject to any disclaimer, the term of this patent is extended or adjusted under 35 U.S.C. 154(b) by 296 days.

(21) Appl. No.: 16/165,284

(22) Filed: Oct. 19, 2018

(65) Prior Publication Data

US 2020/0128018 A1 Apr. 23, 2020

(51) Int. Cl.
*H04L 29/06* (2006.01)

(52) U.S. Cl.
CPC .......... *H04L 63/102* (2013.01); *H04L 63/107* (2013.01); *H04L 63/108* (2013.01)

(58) Field of Classification Search
CPC .... H04L 63/102; H04L 63/107; H04L 63/108
See application file for complete search history.

(56) References Cited

U.S. PATENT DOCUMENTS

| | | | |
|---|---|---|---|
| 9,516,099 B1* | 12/2016 | Engelberg | H04L 67/306 |
| 2008/0086761 A1 | 4/2008 | Hardy et al. | |
| 2008/0088454 A1* | 4/2008 | Flores | G06Q 10/087 340/572.4 |
| 2015/0026026 A1 | 1/2015 | Calman et al. | |
| 2016/0283727 A1* | 9/2016 | Linga | H04L 9/0816 |
| 2018/0004936 A1 | 1/2018 | Bender et al. | |
| 2018/0069866 A1* | 3/2018 | Chalmers | H04L 63/1433 |
| 2019/0272386 A1* | 9/2019 | Ley | G06F 21/6245 |

OTHER PUBLICATIONS

Xing et al., "Upgrading Your Android, Elevating My Malware: Privilege Escalation through Mobile OS Updating", 2014 IEEE Symposium on Security and Privacy, Date of Conference: May 18-21 (Year: 2014).*
Microsoft Docs, "Implementing Lease-Privilege Administrative Models," downloaded at https://docs.microsoft.com/en-us/windows-server/indentity/ad-ds/plan/security-best-practices/implementing-least-privilege-administrative-models, Aug. 8, 2018, 20 pages.
International Search Report and Written Opinion in International Application No. PCT/US19/54300, dated Jan. 2, 2020 (10 pages).

* cited by examiner

Primary Examiner — Morshed Mehedi
(74) Attorney, Agent, or Firm — Benesch, Friedlander, Coplan & Aronoff LLP (57) ABSTRACT

Systems and methods are described herein for managing device privileges.

14 Claims, 6 Drawing Sheets

SYSTEMS AND METHODS FOR MANAGING DEVICE PRIVILEGES

TECHNICAL FIELD

Systems and methods are described herein for managing device privileges.

BACKGROUND

Communication devices are conventionally utilized in various environments. Communication devices can be configured with various features and functions. Each of these features and functions can be used by users of the devices to perform an intended action or obtained a desired result. In some examples, communication devices are required to communicate with a service or an application executing on another system to perform the intended action, which can be located local to the communication device, e.g., on a virtual private network (VPN), or externally (e.g., on the Internet).

SUMMARY

Systems and methods are described herein for managing device privileges.

In an example, a method can include generating, at a server, a user privilege profile for a user associated with a device. The user privilege profile can include one or more rules. The method can include monitoring, at the server, for a requested privilege generated at the device. The requested privilege can be generated by an application executing on the device based on user input at the device. The method can include receiving, at the server, network event information associated with the device. The network event information can be indicative that the device is connected to a given local area network (LAN). The method can include evaluating, at the server, the requested privilege and the one or more rules of the user privilege profile to determine whether to grant the requested privilege for the user at the device. The evaluation can include determining that the device is connected to the given LAN based on the network event information. The method can include granting, at the server, the requested privilege by enabling a function and/or feature for the user at the device based on the evaluating. The function and/or feature can be enabled for the user while the device is connected to the given LAN. The requested privilege can be revoked by the application in response to detecting that the device disconnected from the given LAN.

In a further example, a system can include memory to store machine readable instructions and data. The data can include user profile data for a user and one or more rules that can control one or more privileges for the user of a device. The system can include a processor that can access the memory and execute the machine readable instructions. The machine readable instructions can include a device authenticator that can be programmed to generate a token valid for a given period of time based on the user profile data and an authentication request generated by the device. The device authenticator can be programmed to provide the token to the device. The machine readable instructions can include a privilege monitor that can be programmed to monitor for a requested privilege generated by the device. The privilege monitor can be programmed to evaluate the requested privilege based on the one or more rules, and further based on the token, to determine whether to grant the requested privilege. The evaluation can include evaluating network event data associated with the device to determine whether to grant the requested privilege. The machine readable instructions can include a profile enforcer that can be programmed to enforce the requested privilege at the device based on the evaluating by enabling a given function at the device.

In an even further example, a method can include generating, at a device, a privilege request for enabling a function and/or feature (for example, but not limited to administrative right(s)) for a user on the device while the device is connected to a given LAN. The method can include receiving, at the device, privilege enforcement data generated at a server based on the privilege request. The server can be configured to generate the privilege enforcement data based on an evaluation of the privilege request and a user privilege profile associated with the user. The user privilege profile can include one or more rules for controlling one or more functions and/or features of the user device. The method can include enabling, at the device, the function and/or feature on the device for the user based on the privilege enforcement data. The method can include disabling, at the device, the enabled function and/or feature in response to detecting that the device has disconnected from the given LAN. The method can include re-enabling, at the device, the disabled function and/or feature in response to detecting the device re-connecting to the given LAN.

In another example, a method can include monitoring, at a device, for one of one or more network events and location information generated by a location system. The location information can include global positioning coordinates (GPS) coordinates. The GPS coordinates can be evaluated relative to geo-fence data to determine whether the device is within a geo-fence. The method can include determining, at the device, one of whether the device is connected to a given LAN and is located within the geo-fence. The method can include generating, at the device, a privilege request for enabling a function and/or feature of the device for the user while one of the device is connected to the given LAN and located within the geo-fence. The device can be configured with an operating system. The requested privilege can be enforced by an application executing on the device based on user input at the device. The method can include receiving, at the device, privilege enforcement data generated at a server based on the privilege request. The server can be configured to generate the privilege enforcement data based on an evaluation of the privilege request and a user privilege profile associated with the user. The evaluation can be further based one of the one or more network events and the location information for the user device. The user privilege profile can include one or more rules for controlling one or more functions and/or features of the device. The method can include communicating, at the device, with the server to confirm one of a connection with the server and that a server-side timer has not expired in response to the user being granted the privilege request. The method can include enabling, at the device, the function and/or feature of the device for the user based on the privilege enforcement data, and further based on one of confirming the connection with the server and that the server-side timer has not expired. The method can include detecting, at the device, a disconnect from the given LAN and notifying, at the device, the user on a display that a granted privilege will be disabled upon expiration of a local timer in response to detecting the disconnect from the given LAN. The method can include disabling, at the device, the enabled function and/or feature based on the expiration of the local timer, wherein the disabling corresponds to logging-off of the user from the operating system.

This Summary is provided merely for purposes of summarizing some example embodiments to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages of various disclosed embodiments will become apparent from the following detailed description taken in conjunction with the accompanying drawings which illustrate, by way of example, the principles of the described embodiments.

BRIEF DESCRIPTION OF THE DRAWINGS

Features, objects and advantages other than those set forth above will become more readily apparent when consideration is given to the detailed description below. Such detailed description makes reference to the following drawings.

DETAILED DESCRIPTION

The principle of least privilege (POLP), an important concept in cyber security, is the practice of limiting access rights for users to a minimum required for their use on a device. Under POLP, users are granted permission to read, write or execute only the files or resources they need. In other words, the least amount of privilege necessary. The POLP can be applied to restrict access rights for applications, systems, processes of the device to only those features and/or functions required to perform authorized activities. Currently, there is no convenient way to add and remove a user's access rights and privileges. While ideally an administrator can set up the user with multiple identities and allow the user to log-on as a different user with different rights for each task, this is burdensome and complicated.

Furthermore, if a task is performed by a user having more privileges than necessary to do that task, there is an increased risk that the user inadvertently can do some harm to computer resources, or leave the devices local area network (LAN) vulnerable. To combat security risks posed by devices, in some environments, devices are managed. For example, in a business environment (e.g., a banking environment), devices utilized by users (e.g., employees) can be provisioned by an administrator or an internet technology (IT) department. In a typical example, the administrator would provision a user's access level such that a user would be delegated an extra level of control. Users who have been delegated extra levels of control are typically called privileged users since such user's usage and experience at the device has been restricted (e.g., certain features and/or functions of the device have been disabled). Users who lack privileges are commonly referred to as privileged, regular or normal users. In general, the administrator can define the privileges for a particular user's device by configuring the device's local security policy manager, which can be responsible for defining or setting the user's privilege level. An access token can be generated by a logon service at the device when a user logs on to the device and the credentials provided by the user are authenticated against the authentication database, which includes information characterizing the user's privilege level.

Due to the dynamic nature of the environments in which provisioned devices are utilized, and the ever-changing demand of users of such devices, users often require additional privileges (or rights) that have been provisioned by an environment's superior. Users frequently require administrative privileges at their provisioned devices. However, administrators are often wary of granting user's additional rights given the security risks associated with such a request (e.g., malware attacks, the user downloading content against company's policies, leaving the company's network vulnerable to outside threats, such as proxy threats, maliciously comprising system components of the communication device, etc.).

Furthermore, after granting additional privileges to the users, administrators often fail to revert back the device to its prior provisioned state, which leaves the device and the LAN to which the device is connected vulnerable to security threats. In some examples, some administrative privileges (e.g. taking ownership of or restoring arbitrary files) are so powerful that if used with malicious intent they could allow the entire system to be compromised. Consequently, the user itself is a security threat to the device and the local network environment. In other examples, privileged devices (e.g., devices configured with administrative rights) can be connected to networks outside their local network environment (e.g., an external LAN, the Internet, etc.), which exposes not only the device to cyber threats, but other devices on the local computer network when the device connects back to the approved LAN.

For the sake of explanation, systems and methods are described herein for managing privileges at devices. In some examples, the systems and methods described herein enable a privilege at a device for one of a given period of time (for example, but not limited to, a temporary period of time), until the device disconnects from a given LAN, until the device stops communicating with a service (e.g., a middleware web service), an administrator of the device disables the privilege, and a combination thereof. In an example, according to the systems and methods described herein, elevated access (for example, but not limited to, administrative rights) can be temporarily provided to an operating system of a device and make available one or more features and/or functions of the device for a user that had been previously provisioned (for example, but not limited to, disabled). The technical advantages of the systems and methods described herein will be better understood and become more readily apparent according to the following examples described herein.

Figure 1:
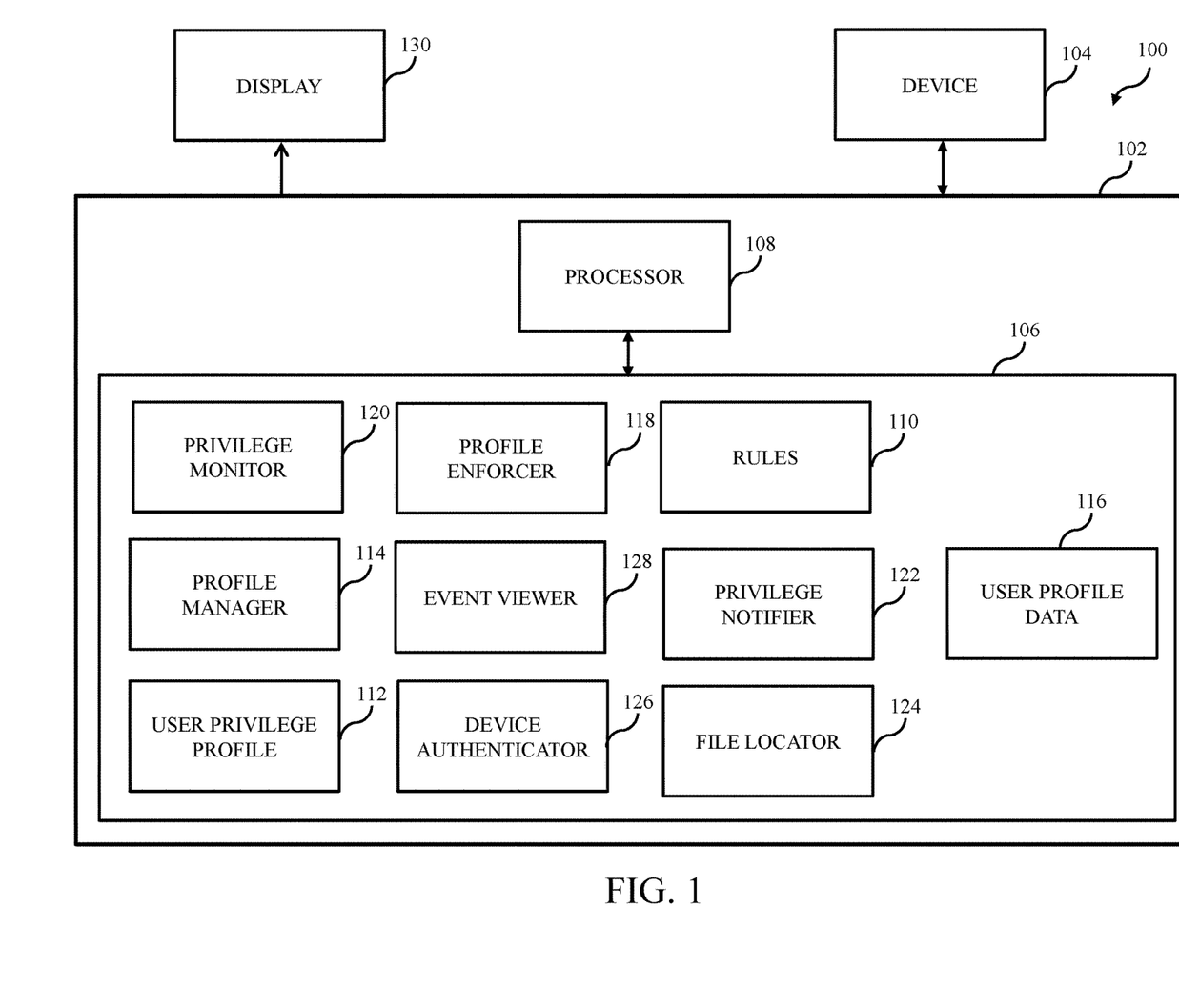
FIG. 1 illustrates an exemplary environment that includes a tool for managing a device.

FIG. 1 illustrates an exemplary environment 100 that includes a tool 102 for managing a device 104. In some examples, the tool 102 and the device 104 can be configured to communicate over one of a wireless, a wired network, and a combination thereof (not shown in FIG. 1). The device 104 can include, but not limited to, a portable device such as a laptop, a tablet, a cellular device, a personal digital assistant (PDA), a non-portable device such as a desktop computer, a special purpose computer, and the like. Although FIG. 1 illustrates an example of managing a single device 104, in some examples, the tool 102 can be configured to manage a plurality of devices, including similar and/or different devices.

The tool 102 can be implemented on a computer, such as a laptop computer, a desktop computer, a server, a tablet computer, a workstation, a mobile device (for example, but not limited to, a cellular device), or the like. The tool 102 can include memory 106 for storing data and machine-readable instructions. The memory 106 can be implemented, for example, as a non-transitory computer storage medium, such as volatile memory (for example, but not limited to, random access memory), non-volatile memory (for example, but not limited to, a hard disk drive, a solid-state drive, flash memory, or the like), or a combination thereof. The tool 102 can include a processor 108 that can be configured to access the memory 106 and execute the machine-readable instructions stored in the memory 106. In some examples, the machine-readable instructions can include a middleware web service. The processor 108 can be configured to execute the middleware web service. The middleware web service can include one or more modules as described herein that can be programmed to communicate with a computer program (e.g., an application) executing on the device 104. The processor 108 can be implemented, for example, as one or more processor cores. In the present example, although the components of the tool 102 are illustrated as being implemented on the same system, in other examples, the different components could be distributed across different systems and communicate, for example, over a network, including a wireless, a wired, and a combination thereof.

The memory 106 can include one or more rules 110 (referred to herein as "rules"). In some examples, the rules 110 can be user defined (e.g., by an administrator, IT department, etc.). The rules 110 can be used to manage one or more functions and/or features (referred to herein as "function") of the device 104. Each of the rules 110 can be associated with a given feature and/or function of the device 104. In some examples, each rule 110 can provide a different level of control of the device 104. A given rule 110 can grant the user of the device 104 with administrative rights corresponding to some or all of the features and/or functions of the device 104 being available for the user (for example, but not limited to, use). In some examples, a given rule 110 can grant the user with less than all administrative rights corresponding to less than all of the features and/or functions of the device 104 being available for the user.

In a non-limiting example, the rules 110 can include, but not limited to, one of a usage rule, a location rule, a time-of-day rule, a timer rule, a computer network rule, an access point rule, and a combination thereof. The usage rule can be used to manage which feature and/or function of the device 104 can be used (for example, but not limited to, made available to the user of the device 104). The location rule can be used to manage the functionality of the device 104 based on a position or location (for example, but not limited to, global positioning system (GPS) coordinates), a floor level, a building, and the like. The computer network rule can be used to manage the functionality of the device 104 based on a LAN (for example, but not limited to, an approved LAN) to which the device 104 is connected. The time-of-day rule can be used to manage the functionality of the device 104 based on a particular day and/or time. The timer rule can be used to manage the functionality of the device 104 according to a predefined amount of time. For example, during the predefined amount of time (for example, but not limited to, for eight hours), the device 104 can have less (or more) capabilities when compared to other times. The access point rule can be used to manage the functionality of the device 104 based on a particular access point (for example, but not limited to, a WiFi access point) to which the device 104 is connected on the LAN.

In some examples, the memory 106 can include a user privilege profile 112. A profile manager 114 can be programmed to associate all or at least a portion of the rules 110 with the user privilege profile 112 for the user of the device 104. Thus, in some examples, the user privilege profile 112 can include all or at least a portion of the rules 110. The profile manager 114 can be programmed to associate the user privilege profile 112 with user profile data 116 for the user of the device 104. Thus, in some examples, the user privilege profile 112 can include all or at least a portion of the user profile data 116. The user profile data 116 can include, but not limited to, one of a device identifier (ID) assigned to the device 104, a user ID assigned to the user of the device 104, and a combination thereof. In some examples, a plurality of users can be associated with a given device 104. In this example, a respective user privilege profile 112 can be associated with corresponding user profile data 116 for each user of the given device 104. As such, in this example, the memory 106 can include a plurality of user privilege profiles 112 that can be associated with corresponding user profile data 116 for each user of the given device 104.

In some examples, the profile manager 114 can be programmed to generate the user privilege profile 112 for the user of the device 104 (for example, but not limited to, a new user of the device 104). For example, upon determining that no user privilege profile exists for the user, the profile manager 114 can be programmed to generate the user privilege profile 112 and store the user privilege profile 112 in the memory 106. The profile manager 114 can be programmed to associate all or a subset of the rules 110 with the new user privilege profile 112. In some examples, the profile manager 114 can be programmed to define the user privilege profile 112 for the device 104 based on user input at an input device (for example, but not limited to, a keyboard, a mouse, a microphone, etc.). For example, the user input can select (or identify) one or more rules 110 for association with the user privilege profile 112 for the user of the device 104.

Additionally, or alternatively, the profile manager 114 can be programmed to generate the user privilege profile 112 for the device 104 based the user profile data 116. The profile manager 114 can be programmed to retrieve (or receive) the user profile data 116 associated with the user of the device 104. In some examples, the profile manager 114 can be programmed to retrieve (or receive) from the device 104 the user profile data 116 for the user. As such, in an example, the device 104 can be configured to generate all or a portion of the user profile data 116. For example, the device 104 can be configured to provide the user ID and/or the device ID (e.g., in a client request). In other examples, the profile manager 114 can be configured to generate the privilege profile 112 based on the user input at the input device 104 (not shown in FIG. 1).

The memory 106 can include a profile enforcer 118. The profile enforcer 118 can be programmed to enforce each user privilege profile 112 for each user of the device 104, as defined by the profile manager 114. The profile enforcer 118 can be programmed to enforce the user privilege profile 112 to enable or disable a function of the device 104. For example, the profile enforcer 118 can be programmed to manage the device 104 based on the rules 110 of the user privilege profile 112. In some examples, the profile enforcer 118 can be programmed to provision the device 104 such that less than all of the one or more functions and/or features of the device 104 are available based on the user privilege profile 112. In this example, the user can be referred to as an unprivileged user since this user has been delegated less than all of the one or more functions and/or features of the device 104. In another example, the profile enforcer 118 can be programmed to manage the device 104 such that all or more of the one or more functions and/or features of the device 104 are available based on the user privilege profile 112. In this example, the user can be referred to as a privileged user.

In some examples, the memory 106 can include a privilege monitor 120. The privilege monitor 120 can be programmed to monitor the device 104. The privilege monitor 120 can be programmed to monitor for a privilege request generated by the device 104. In other examples, the privilege monitor 120 can be programmed to monitor for the privilege request based on user input from a user (for example, but not limited to, a manager, security team, administrator, IT team, etc.) at an input device. The privilege request can include, but not limited to, one of a requested function and/or feature, the user ID, the device ID, a time duration for the requested function (for example, but not limited to, a temporary or permanent privilege level change), a start time for the requested function (for example, but not limited to, when the requested function should be enabled at the device 104), an end time for the requested function (for example, but not limited to, when the request function should be disabled at the device 104), an Internet Protocol (IP) address for the device 104, timestamp information (for example, but not limited to, when the privilege request was generated by the device 104), and a combination thereof. In some examples, the privilege request can be generated by the device 104 based on user input associated with the user. As such, in some examples, the user of the device 104 can request a change in privilege level.

The privilege monitor 120 can be programmed to receive the privilege request. The privilege monitor 120 can be programmed to evaluate the privilege request to determine whether a user privilege profile exists for the user. For example, the privilege monitor 120 can be configured to evaluate the privilege request and the user profile data 116 (for example, but not limited to, by comparing the user ID, the device ID, or both). Upon determining that no user privilege profile exists for the user, the privilege monitor 120 can communicate with the profile manager 114 to generate a new user privilege profile for the requesting user, as described in greater detail herein. In some examples, the privilege monitor 120 can be programmed to determine that a user privilege profile exists for the user.

In some examples, the privilege monitor 120 can be programmed to determine whether the requested function should be granted or denied for the user based on one or more device parameters associated with the device 104. For example, the privilege monitor 120 can be programmed to determine whether the device 104 is connected to the LAN by evaluating a network parameter associated with the device 104 (for example, but not limited to, by evaluating an access point IP address to which the device 104 is connected). Upon determining that the device is not connected to the LAN, the privilege monitor 120 can be programmed to deny (or cause to deny) the requested function. In other examples, the privilege monitor 120 can be programmed to evaluate a geographical location parameter associated with the device 104. In this example, the privilege monitor 120 can be programmed to determine whether the device 104 is within a defined geographical boundary (e.g., geo-fence) based on location information (for example, but not limited to, GPS coordinates) for the device 104. Upon determining that the device 104 is not within the defined geographical boundary, the privilege monitor 120 can be programmed to deny (or cause to deny) the requested function. In other examples, the privilege monitor 120 can be programmed to evaluate a timestamp parameter associated with the privilege request relative to a specified time and/or day. Upon determining that the device 104 is not requesting the requested function within the specified time and/or day based on the timestamp parameter (for example, but not limited to, on a particular day and/or within a specified time frame), the privilege monitor 120 can be programmed to deny (or cause to deny) the requested function.

In some examples, upon determining that the requested privilege should be granted (for example, but not limited to, determining that the device 104 is connected to the LAN, the device is within the predefined geographical boundary, and/or that the device 104 is requesting the requested function within the specified time and/or day), the privilege monitor 120 can be programmed to generate a profile change request. The profile manager 114 can be programmed to change (for example, but not limited to, update) the user privilege profile 112 associated with the user, e.g., by associating or disassociating the rules 110 with the user privilege profile 112 based on the profile change request. The profile change request can identify one or more rules of the rules 110 for association or dissociation with the user privilege profile 112. As such, the profile change request can update the user privilege profile 112 for the user.

In some examples, the user can be granted the requested privilege for a given period of time based on the rules 110 (for example, but not limited to, about for eight hours). The profile enforcer 118 can be programmed to enforce the updated user privilege profile 112 for the user to make available the requested privilege for the user at the device 104. For example, the profile enforcer 118 can be programmed to generate privilege enforcement data. The profile enforcer 118 can be programmed to provide the privilege enforcement data to the device 104. The profile enforcer 118 can be programmed to provide the privilege enforcement data to the device 104 and, in some examples, cause the device 104 to process the privilege enforcement data corresponding to enforcing the updated user privilege profile 112 (for example, but not limited to, enabling or disabling the requested function).

In some examples, upon determining that the requested privilege should be granted or denied, the privilege monitor 120 (or the profile enforcer 118) can be programmed to generate privilege notification data. In some examples, the memory 106 can include a privilege notifier 122. The privilege notifier 122 can be programmed to provide the privilege notification data to the device 104 to notify the user (for example, but not limited to, on a display of the device 104) whether the requested privilege was granted or denied. In some examples, privilege notifier 122 can be programmed to generate and provide an email that can include the privilege notification data. In other examples, the privilege notifier 122 can be programmed to generate and transmit a short message service (SMS) and/or push notification that can include the privilege notification data. The SMS and/or the push notification can be provided to the device 104, another device associated with the user (not shown in FIG. 1), or both.

In some examples, the requested privilege can correspond to one of request to download a file (e.g., an executable file) or a request for a file. In these examples, the privilege monitor 120 can be programmed to generate a file request (for example, but not limited to, upon determining that the requested privilege should be granted, as described herein). In some examples, the privilege monitor 120 can be programmed to communicate with the profile manager 114 to confirm (or verify) that the requested privilege is permitted for the user at the device 104. In these examples, the profile manager 114 can be programmed to evaluate the requested privilege and the user privilege profile 112 for the user to determine whether the requested privilege is permitted for the user at the device 104. Upon determining that the requested privilege should be granted or is permitted, the privilege monitor 120 can be programmed to provide the file request to a file locator 124.

The file locator 124 can be programmed to retrieve the requested file based on the file request. In some examples, the file locator 124 can be programmed to analyze a name of the file being requested. In an example, the file locator 124 can be programmed to retrieve the requested file from the Internet and provide the requested file to the device 104. In other examples, the file locator 124 can notify the administrator of the requested file. The administrator can manually retrieve the file (e.g., from the Internet) and provide the file to the device 104 (for example, but not limited to, execution). In an example, the file locator 124 can be programmed to retrieve the requested file and store the file on a computer and/or in a cloud. The file locator 124 can be programmed to generate file location data (for example, but not limited to, a URL, a directory identifier, etc.) for the file. The file locator 124 can be programmed to provide the file location data to the device 104. The device 104 can be configured to retrieve the file based on the file location data. In an example, upon the device 104 retrieving the file, the device 104 can be configured to automatically utilize the file (for example, but not limited to, execute the file), or notify the user of the device 104 that the file is ready for use.

In some examples, the privilege monitor 120 can be programmed to monitor the device 104 for user status data. The device 104 can be configured to generate the user status data, for example, based on the user input associated with the user of the device 104. The user status data can include, but not limited to, one of the user ID, the device ID, credentials, an authentication token, and a combination thereof. In some examples, the privilege request can include the user status data. The privilege monitor 120 can be programmed to evaluate the user status data and the user profile data 116 to identify the user. Upon a successful identification, the privilege monitor 120 can be programmed to determine whether the user should be granted a function (for example, but not limited to, the requested function, as described herein), or whether the function should be continued to be made available for the user at the device 104. The determination can be based on one of the user privilege profile 112 (for example, but not limited to, the rules 110), the one or more device parameters associated with the device 104 (for example, but not limited to, the network parameter, the geographical parameter, the timestamp parameter, etc.), and both. The privilege monitor 120 can be programmed to initiate a timer (for example, but not limited to, a software clock) in response to the profile enforcer 118 enabling the requested function and thereby granting a privilege at the device 104. In some examples, the timer can count up or down until a defined time (for example, but not limited to, the timer can count up to 60 minutes or seconds). At the defined time, the privilege monitor 120 can be programmed to disable (or cause to disable) a granted privilege, as described herein.

In some examples, the privilege monitor 120 (or the profile enforcer 118) can be programmed to periodically poll (or request) the user status data. For example, the privilege monitor 120 can be programmed to generate a privilege status request. The privilege status request can be generated periodically (for example, but not limited to, every couple of seconds, every hour, every two-three hours, etc.). The privilege monitor 120 can be programmed to provide the privilege status request to the device 104. The device 104 can be configured to generate and provide the user status data to the privilege monitor 120 in response to receiving the privilege status request. In some examples, the user status data can include, but not limited to, one of information identifying the LAN to which the device 104 is connected, an amount of time that has been granted for a privilege, an amount of time remaining for the privilege, and a combination thereof.

Additionally, or alternatively, the privilege monitor 120 (or the profile enforcer 118) can be programmed to monitor for network events associated with the device 104 in response to the profile enforcer 118 enabling the requested function. The device 104 (or another system, such as a network monitoring system configured for monitoring devices including the device 104 for network events) can be configured to generate network event data characterizing a given network event (for example, but not limited to, that the device 104 is no longer connected to a given LAN). The network event data can include information characterizing a network disconnect, a network connect, a change from a wireless network to a wired network, etc.

As further described in greater detail herein, the device 104 can be configured to disable a granted privilege (e.g., the requested function) in response detecting a network disconnect, a re-connection to a previously connected network (for example, but not limited to, the given LAN), a change in network (for example, but not limited to, connecting to a wireless network that is on a similar LAN as a wired network, or vice-versa. In some examples, the device 104 can be configured to disable the granted privilege if a given amount of time has lapsed since the privilege had been granted (for example, but not limited to, known as a privilege window) regardless of whether the device 104 establishes a connection with the given LAN. In some examples, the device 104 can be configured to notify the user that the granted privilege will be disabled within a defined period of time (for example, but not limited to, within 20 minutes). In an example, upon the device 104 reestablishing a connection with the given LAN and the privilege window having not lapsed, the device 104 can be configured to re-enable the granted privilege. The device 104 can be configured to notify the privilege monitor 120 that the granted privilege has been re-enabled.

In some examples, the memory 106 can include a device authenticator 126. The device authenticator 126 can be programmed to monitor the device 104 for an authentication request. In some examples, the privilege request can include the authentication request. The authentication request can include, but not limited to, one of the user ID, the device ID, credentials, an authentication token, and a combination thereof. The device 104 can be configured to generate the authentication request over a secure channel (for example, but not limited to, via a secure hypertext transfer protocol secure (https) connection). The device authenticator 126 can be programmed to receive and evaluate the authentication request. In some examples, the evaluation can include comparing the user profile data 116 and the authentication request. The device authenticator 126 can be programmed to generate a token, which can be valid for a given period of time (e.g., an hour) based on the evaluation. For example, if the evaluation includes a comparison, and the comparison indicates that the user ID and/or device ID of the authentication request matches the user ID and/or device ID of the user profile data 116, the device authenticator 126 can generate the token. In an example, wherein the comparison indicates that the user ID and/or device ID of the authentication request does not match the user ID and/or device ID of the user profile data 116, the device authenticator 126 can issue an unauthorized log request. The device authenticator 126 can be programmed to store in the memory 106 token data characterizing the token.

The device authenticator 126 can be programmed to provide the token to the device 104. The device 104 can be configured to include the token in future communications with the tool 102 to confirm that the user of the device 104 is an authorized user (for example, but not limited to, a user that can request a change in device privilege or maintain a granted device privilege). During all or some of the communications between the tool 102 and the device 104, the device authenticator 126 can be programmed to receive and validate the user based on the token. To validate the user, the device authenticator 126 can be programmed to evaluate one of, but not limited to, the token, the user ID and the device ID, and a combination thereof, during a given communication relative to the user ID, the device ID, and/or the token data stored in the memory 106. In some examples, the device authenticator 126 can be programmed to further to validate the user based on a set amount of time that the token is valid. The device authenticator 126 can be programmed to notify the privilege monitor 120 that the user is authorized (or not authorized) for the given privilege (for example, but not limited to, an existing given privilege, or a request for a new privilege) based on the evaluation. In some examples, if the token has expired, the device 104 can be configured to request a new token. The device authenticator 126 can be programmed to transmit the new token to the device 104 for future communications between the tool 102 and the device 104.

In an example, wherein the user is no longer authorized, the device 104 can be configured to revoke automatically or within a given period of time a granted privilege (for example, but not limited to, administrative right). In some examples, the device 104 can be configured to periodically poll the device authenticator 126 using the token to ensure that the user is entitled to have the granted privilege. If there is a revoke of rights for any reason, the device 104 can be configured to present the user with a warning that the given privilege will be disabled within a given amount of time. In some examples, if the given privilege is to be revoked, the device 104 can be configured to forcefully log the user of the device 104 and reset the device 104 corresponding to disabling the given privilege.

The privilege monitor 120 can be programmed to generate a privilege expired notification in response to determining, e.g., that the device 104 is no longer connected to the local computer network (for example, but not limited to, failure in communication with the device 104), the amount of time granted for the privilege has expired, the amount of time remaining for the privileged has expired, and/or a combination thereof. The privilege expired notification can include, but not limited to, data identifying one of the user, the device 104, and/or a combination thereof (for example, but not limited to, the privilege expired notification can include the user ID and/or the device ID). The privilege monitor 120 can be programmed to provide the privilege expired notification to the profile manager 114. The profile manager 114 can be programmed to modify the user privilege profile 112 to strip (or disable) the privileged function at the device 104. The profile manager 114 can be programmed to provide the modified user privilege profile 112 to the profile enforcer 118. In some examples, the profile enforcer 118 can be programmed to enforce the modified user privilege profile 112 to provision the privilege function at the device 104 (for example, but not limited to, disable the privileged function).

In some examples, the memory 106 can include an event viewer 128. The event viewer 128 can be programmed to log each event associated with each user of the communication device 104. In some examples, the event viewer 128 can be programmed to log the event associated with the unauthorized log request. Additionally, or alternatively, the event viewer 128 can be programmed to log event and action associated with tool 102, including but not limited to, providing users with a particular privilege (for example, but not limited to, administrative privilege), reporting user rights for a corresponding user when a local privilege client is executed (or installed) on the device 104, reporting users who had their privilege revoked, number of users granted the particular privilege, a number of times that the particular privilege has been requested, a number of times that the user privilege profile 112 has been modified, etc. In an example, the event viewer 128 can be programmed to store in the memory 106 event data (e.g., a text file) characterizing changes in privilege profiles for each user of the device 104 and/or network settings for the device 104. In some examples, the event viewer 128 can be programmed to dynamically update the stored event data upon detecting a change in the user privilege profile 112 associated with the user. The event viewer 128 can be programmed to generate display data. The display data can include the stored event data. The processor 104 can be programmed to retrieve the display data and render the display data on a display 130. As such, the stored event data can be visualized to provide provisioning history for each user of each device 104.

Figure 2:
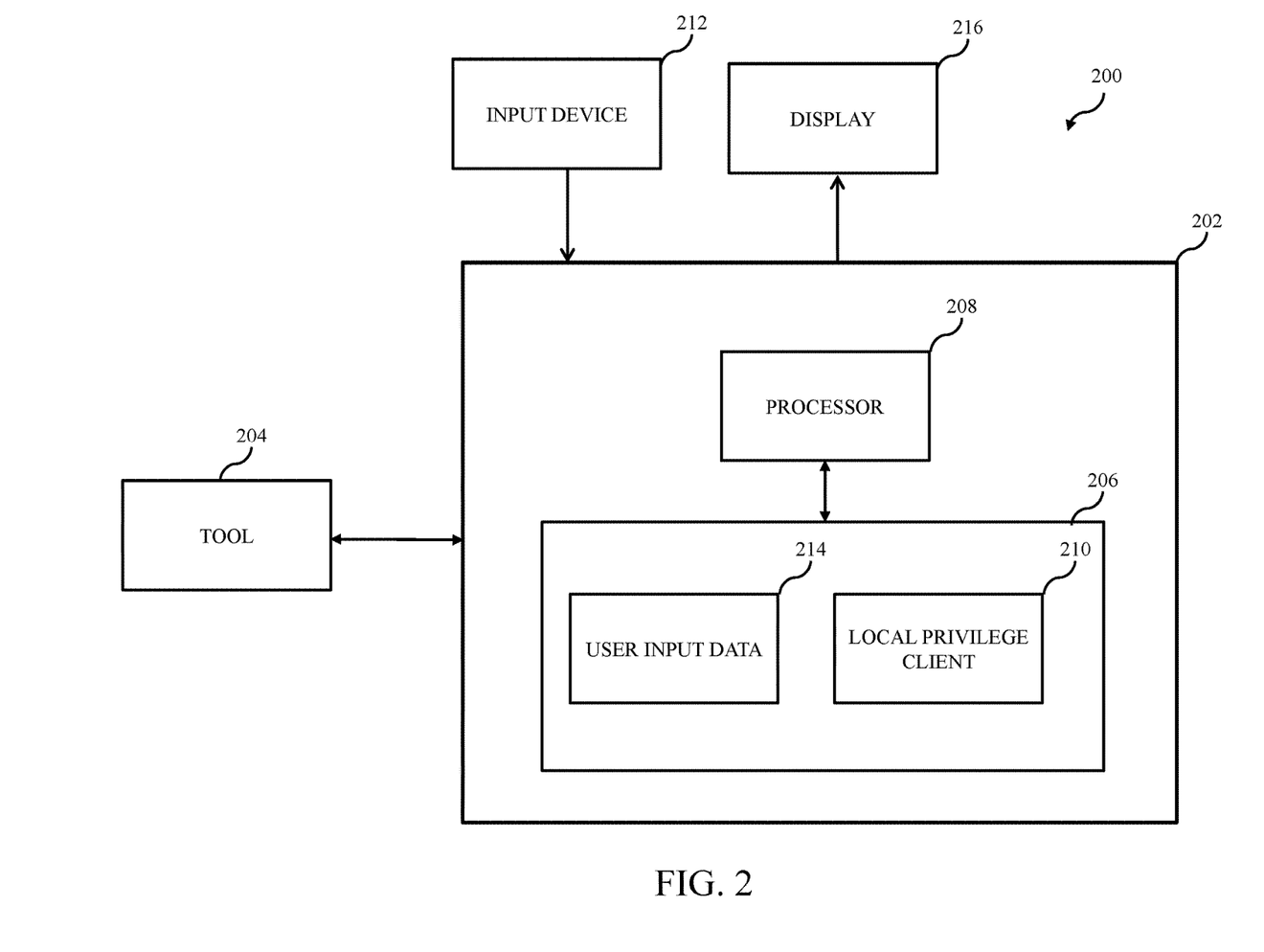
FIG. 2 illustrates an exemplary environment that includes a device.

FIG. 2 illustrates an exemplary environment 200 that includes a device 202. In some examples, the device 202 can correspond to the device 102, as illustrated in FIG. 1. The device 202 can be configured to communicate with a tool 204. In some examples, the tool 204 can correspond to the tool 102, as illustrated in FIG. 1. The device 202 and the tool 204 can be configured to communicate over one of a wireless, a wired network, and a combination thereof (not shown in FIG. 2). The device 204 can include, but not limited to, a portable device such as a laptop, a tablet, a cellular device, a PDA, a non-portable device such as a desktop computer, a special purpose computer, and the like.

In some examples, the device 202 can be implemented on a computer, such as a laptop computer, a desktop computer, a server, a tablet computer, a workstation, a mobile device (for example, but not limited to, a cellular device), or the like. The device 202 can include memory 206 for storing data and machine-readable instructions. The memory 206 can be implemented, for example, as a non-transitory computer storage medium, such as volatile memory (for example, but not limited to, random access memory), non-volatile memory (for example, but not limited to, a hard disk drive, a solid-state drive, flash memory or the like), or a combination thereof. The tool 202 can include a processor 208 that can be configured to access the memory 206 and execute the machine-readable instructions stored in the memory 206. In an example, the machine-readable instructions can include a local privilege application. The processor 208 can be implemented, for example, as one or more processor cores. In the present example, although the components of the device 202 are illustrated as being implemented on the same system, in other examples, the different components could be distributed across different systems and communicate, for example, over a network, including a wireless, wired, or a combination thereof.

The memory 206 can include a local privilege client 210. Upon request from a user at the device 202 (e.g., based on input for a given privilege at input device 210) the local privilege client 210 can be programmed to validates the request with the tool 204, provided that the local privilege client 210 can communicate with the tool 204 via a given LAN. If the user request is valid, the local privilege client 210 can be programmed to add at least one of a User ID associated with the user, the device 202, or a combination thereof, to an administrative group list, which can be stored by the local privilege client 210 in the memory 206. The local privilege client application 210 can be programmed to remove the User ID from the administrator group list and, in some examples, force the user to log-off, for example, after a set timer. As such, the local privilege client 210 can be programmed to update the administrative group list during the privilege revoke process.

In some examples, the local privilege client 210 can correspond to the local privilege application. In some examples, the tool 204 can be programmed to provide the local privilege client 210 to the device 202 for execution thereon based on user input. For example, the user can issue an application request on the device 202 for the local privilege client 210. In an example, the application request can include, but not limited to, a user ID associated with the user and/or a device ID associated with the device 202. The tool 204 can be programmed to evaluate the application request and upon approving the application request provide the local privilege client 210 to the device 202. In some examples, the evaluation of the application request can include comparing one of the user ID and/or the device ID, credentials, the authentication token, and a combination thereof, to an approved client list stored at the tool 204. The approved client list can identify one or more devices and/or users that have been approved for receiving the local privilege client 210. In other examples, the tool 204 can be programmed to notify an administrator that the local privilege client 210 is being requested at the device 202.

In some examples, the local privilege client 210 can be programmed to communicate with the tool 204. As such, in some examples, the local privilege client 210 can be programmed to communicate with the profile enforcer 118, the privilege monitor 120, and/or the device authenticator 126, as illustrated in FIG. 1. Upon execution, the local privilege client 210 can be programmed to generate an authentication request. The local privilege client 210 can be programmed to provide the authentication request to the tool 204. In some examples, the authentication request can include, but not limited to, one of the user ID, the device ID, the credentials, the authentication token, and a combination thereof, associated with the user and/or the device 202. The local privilege client 210 can be configured to transmit the authentication request over a secure channel (for example, but not limited to, via a secure https connection) to the tool 204.

The local privilege client 210 can be programmed to monitor for a token (for example, but not limited to, the authentication token) generated by the tool 204. In some examples, the local privilege client 210 can be programmed to generate a token request. For example, the user can log-on to the device 202 using their credentials. The local privilege client 210 can be configured to generate the token request based on one of the device ID (or name), the User ID, the credentials, and a combination thereof. The local privilege client 210 can be programmed to provide the token request to the tool 204. The tool 204 can be programmed to validate the token request and generate the token. The tool 204 can be programmed to provide the token to the device 202 for further communications between the device 202 and the tool 204. As such, in future communications, the local privilege client 210 can be programmed to the include the token for validation. The token can be valid for a given period of time (for example, but not limited to, an hour) and once expired the local privilege client 210 can be programmed to initiate another token request. The new token can be valid for a new given period of time (for example, but not limited to, for another additional hour). Upon request from the user, in some examples, via the local privilege client 210, and if the user is authorized for a privilege (for example, but not limited to, an administrative right(s)) by the tool 204, the local privilege client 210 can be programmed to configure the device 202 to provide the user at the device with the privilege.

The device 202 can include an input device 212. The input device 212 can include, but not limited to, a touchscreen, a mouse, a keyboard, a microphone, a combination thereof, and the like. The user can generate user input data 214 at the input device 212. In some examples, the user input data 214 can include a request for a given privilege. The given privilege can correspond to a request that a feature and/or function be enable of the device 202. For example, the given privilege can correspond to a request to install and/or download an executable file. In other examples, the given privilege can correspond to a request to download a file and/or a request for a file. In an example, the given privilege can correspond to a request for an administrative right.

The local privilege client 210 can be programmed to generate a privilege request based on the user input data 214. The privilege request can include, but not limited to, one of the user ID, the device ID, the credentials, the authentication token, the requested given privilege, and a combination thereof. The local privilege client 210 can be programmed to provide the privilege request to the tool 204. The tool 204 can be programmed to evaluate the privilege request according to the systems and methods described herein. The tool 204 can be programmed to one of grant or deny the requested privilege at the device 202. The tool 204 can be programmed to provide privilege enforcement data to the local privilege client 210. The local privilege client 210 can be programmed to enforce the requested privilege based on the privilege enforcement data and notify the user on a display 216 that the requested privilege has been enforced.

In an example, upon the local privilege client 210 enforcing the requested privilege, the user of the device 202 can be notified that the requested privilege is available (for example, but not limited to, use). In some examples, the requested privilege can be available for a given period of time (for example, but not limited to, for eight hours). As described herein, the local privilege client 210 can be programmed to periodically validate if the user is authorized to have a given privilege (for example, but not limited to, the requested privilege). For example, the local privilege client 210 can be programmed to provide user status data to the tool 204 for evaluation according to the systems and methods described herein. The tool 204 can be configured to notify the device 202 whether the user is authorized.

In some examples, wherein the local privilege client 210 is unable to validate the user's authorization for the given privilege at the device 202, the local privilege client 210 can be programmed to disable the given privilege automatically and notify the user on the display 216 that the requested privilege has been disabled, or notify the user on the display 216 that the requested privilege will be disabled within a given period of time (for example, but not limited to, within 20 minutes). In some examples, wherein the local privilege client 210 is unable to communicate with the tool 204, the local privilege client 210 can be programmed to disable the given privilege automatically and notify the user on the display 216 that the requested privilege has been disabled, or notify the user on the display 216 that the requested privilege will be disabled within the given period of time. In some examples, the user can be granted the given privilege upon the device 204 being connected to a given LAN. In these examples, the user can be automatically granted the given privilege for the given period of time.

In some examples, the local privilege client 210 can be programmed to provide network event data to the tool 204 when the device 202 one of re-establishes a connection with the given LAN. The local privilege client 210 can be programmed to evaluate the network event data. The local privilege client 210 can be programmed to evaluate the network event data to determine whether the granted privileged should be enabled, continue to be enabled at the device 202, or disabled. The local privilege client 210 can be programmed to disable a granted privilege (for example, but not limited to, the requested function) in response to detecting a network disconnect, failing to establish a connection with the given network, a network connection such as a re-connection to a previously connected network, a change in network, and the like. In some examples, the local privilege client 210 can be programmed to disable the granted privilege if a given amount of time has lapsed since the privilege had been granted regardless of whether the device 204 establishes a connection with the given LAN. In some examples, the local privilege client 210 can be programmed to notify the user that the granted privilege will be disabled within a defined period of time (for example, but not limited to, within 20 minutes) on the display 216. In an example, upon the device 204 connecting back to the given LAN and the given amount of time not lapsing, the local privilege client 210 can be programmed to re-enable the granted privilege for a remaining amount of time of the given amount of time. The local privilege client 210 can be programmed to notify the tool 204 that the granted privilege has been re-enabled.

In an example, wherein the user is no longer authorized, the local privilege client 210 can be programmed to revoke automatically or within a given period of time a granted privilege (for example, but not limited to, administrative right). In some examples, the local privilege client 210 can be programmed to periodically poll the tool 204 with the token to confirm that the user is permitted the granted privilege. If there is a revoke of rights for any reason, the local privilege client 210 can be programmed to present the user on the display 216 with a notification that the given privilege is disabled or will be disabled in a given amount of time. In some examples, if the given privilege is to be revoked, the local privilege client 210 can be programmed to forcefully log the user of the device 204 and reset the device 204 corresponding to disabling the given privilege.

In some examples, the local privilege client 210 can be programmed to monitor for one or more network events (for example, but not limited to, a disconnect from the given LAN by the device 202, a connection to the given LAN by the device 202, a change from a wireless network to a wired network by the given device, etc.). In some examples, the local privilege client 210 can be programmed to monitor for location information generated by a location system. In a non-limiting example, the location system can correspond to a global positioning coordinate (GPS) system of the device 202. In this example, the location information can include GPS coordinates for the device 202. In other examples, the location information can include relative coordinates for the device 202. The local privilege client 210 can be programmed to evaluate the GPS coordinates relative to geo-fence data to determine whether the device 202 is located within a geo-fence.

The geo-fence data can characterize a geo-boundary for a point of interest (POI). The POI can include, but not limited to, one of a building, one or more floors of the building, a business, a complex, an apartment, a school, and a combination thereof. In some examples, the geo-boundary can have a greater virtual footprint than an actual footprint of the POI. In other examples, the geo-boundary has a virtual footprint substantially equal to the actual footprint of the POI. In some example, the geo-fence data can be stored in the memory 206 of the device 202. In other examples, the geo-fence data can be stored on another system (e.g., for example, but not limited to, the tool 204, a cloud, a server, etc.).

In an example, the local privilege client 210 can be programmed to determine whether the device 202 is connected to the given LAN. In another example, the local privilege client 210 can be programmed to determine whether the device 202 is located within the geo-fence based on the location information and the geo-fence data. The local privilege client 210 can be configured to generate a privilege request for enabling a function and/or feature of the device for the user while one of the device is connected to the given LAN, in some examples, and, in other examples, located within the geo-fence. The device 204 can be configured with an operating system. An operating system can be referred to, in an example, as software that controls the allocation and usage of hardware resources such as features, functions, memory, central processing unit time and peripheral devices. Examples of operating systems can include, but not limited to, Windows®, MAC OS, UNIX, LINUX and BE operating systems.

The local privilege client 210 can be programmed to communicate with the tool 204 to confirm one of a connection with the tool 204 and that a server-side timer has not expired in response to the user being granted the privilege request. The local privilege client 210 can be programmed to enable the function and/or feature of the device for the user based on the privilege enforcement data, and further based on one of confirming the connection with the server and that the server-side timer has not expired. The local privilege client 210 can be programmed to monitor for a disconnect from the given LAN by the device 202. The local privilege client 210 can be programmed detect the disconnect from the given LAN by the device 202. The local privilege client 210 can be programmed to notify the user on the display 216 that a granted privilege will be disabled upon expiration of a local timer in response to detecting the disconnect from the given LAN. In some examples, the local timer is set to expire within a define amount of time (for example, but not limited, within about 20 minutes). The local privilege client 210 can be programmed to disable the enabled function and/or feature based on the expiration of the local timer. In some examples, disabling the enabled function can correspond to logging-off of the user from the operating system.

Moreover, certain examples described herein have also been referred herein with regards to block illustrations of methods, systems, and computer program products. It will be understood that blocks of the illustrations, and combinations of blocks in the illustrations, can be implemented by computer-executable instructions. These computer-executable instructions may be provided to one or more processors of a general-purpose computer, special purpose computer, or other programmable data processing apparatus (or a combination of devices and circuits) to produce a machine, such that the instructions, which execute via the one or more processors, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions can also be loaded onto a computer or other programmable data processing apparatus to cause a series of operational steps to be performed on the computer or other programmable apparatus to produce a computer-implemented process such that the instructions which are executed on the computer or other programmable apparatus provide steps for implementing the functions specified in the flowchart block or blocks.

Figure 3:
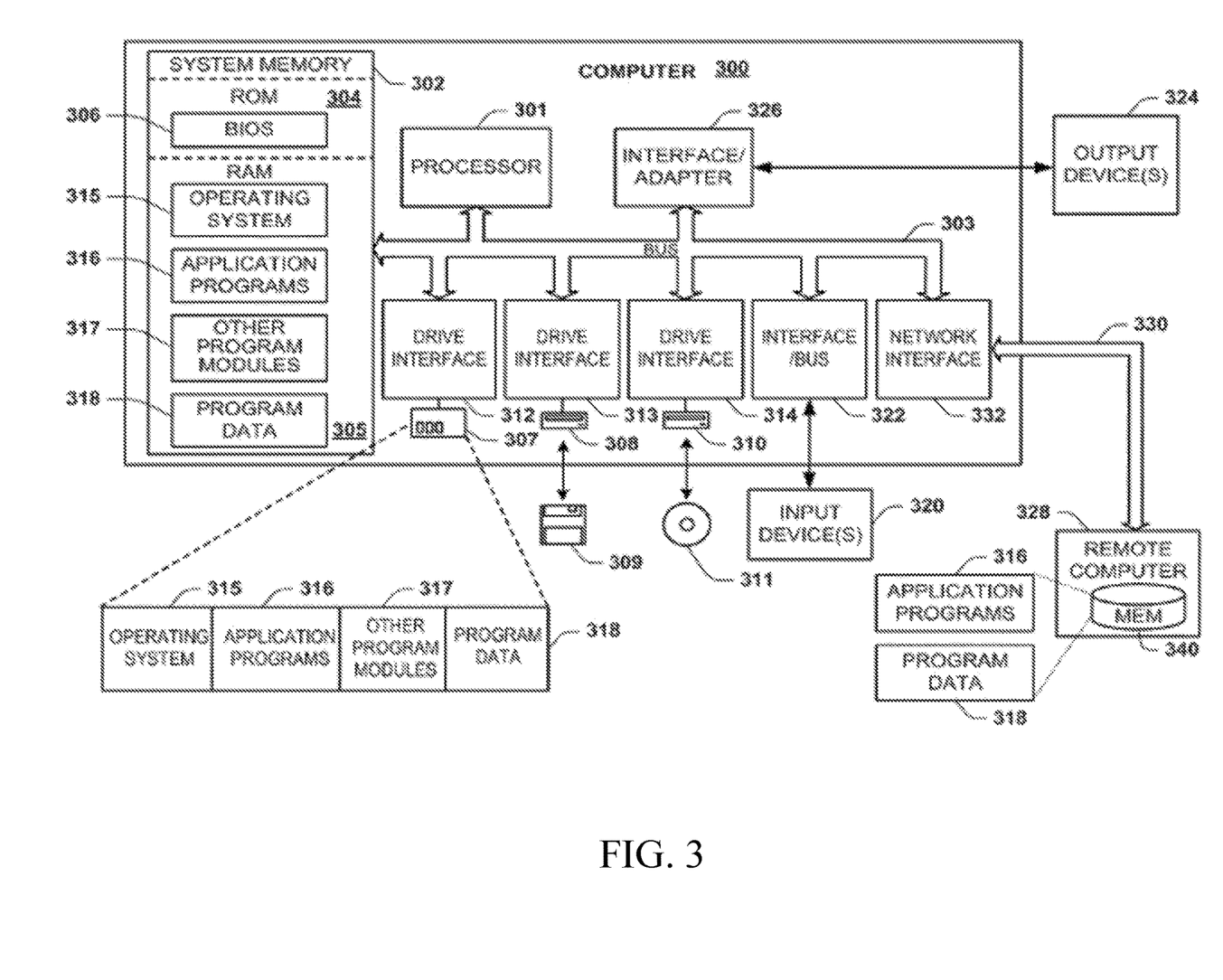
FIG. 3 schematically illustrates an exemplary computing environment in which systems and methods described herein can be implemented.

In this regard, FIG. 3 illustrates an example of a computer system 300 that can be employed to execute one or more examples described herein. Computer system 300 can be implemented on one or more purpose networked computer systems, embedded computer systems, routers, switches, server devices, client devices, various intermediate devices/nodes or standalone computer systems. Additionally, computer system 300 can be implemented on various mobile clients such as, for example, a PDA, laptop computer, pager, and the like, provided it includes sufficient processing capabilities.

Computer system 300 can include processing unit 301, system memory 302, and system bus 303 that can couple various system components, including the system memory 302, to processing unit 301. Dual microprocessors and other multi-processor architectures also can be used as processing unit 301. System bus 303 may be any of several types of bus structure including a memory bus or memory controller, a peripheral bus, and a local bus using any of a variety of bus architectures. System memory 302 can include read only memory (ROM) 304 and random-access memory (RAM) 305. A basic input/output system (BIOS) 306 can reside in ROM 304 containing the basic routines that help to transfer information among elements within computer system 300.

Computer system 300 can include a hard disk drive 307, magnetic disk drive 308, e.g., to read from or write to removable disk 309, and an optical disk drive 310, e.g., for reading CD-ROM disk 311 or to read from or write to other optical media. Hard disk drive 307, magnetic disk drive 308, and optical disk drive 310 can be connected to system bus 303 by a hard disk drive interface 312, a magnetic disk drive interface 313, and an optical drive interface 314, respectively. The drives and their associated computer-readable media provide nonvolatile storage of data, data structures, and computer-executable instructions for computer system 300. Although the description of computer-readable media above refers to a hard disk, a removable magnetic disk and a CD, other types of media that are readable by a computer, such as magnetic cassettes, flash memory cards, digital video disks and the like, in a variety of forms, may also be used in the operating environment; further, any such media may contain computer-executable instructions for implementing one or more parts of the disclosure described herein.

A number of program modules can be stored in drives and RAM 305, including operating system 315, one or more application programs 316, other program modules 317, and program data 318. The one or more program modules can include any of the one or more modules as illustrated in FIGS. 1 and/or 2. In an example, the one or more program modules can include the profile manager 114, the profile enforcer 118, the privilege monitor 120, the privilege notifier 122, the file locator 124, the device authenticator 126, and the event viewer 128, as illustrated in FIG. 1. In another example, the one or more program modules can include the local privilege client 210, as illustrated in FIG. 2. In some examples, the application programs 316 and program data 318 can include functions and methods programmed to receive and process data associated with the program modules 317.

A user may enter commands and information into computer system 300 through one or more input devices 320, such as a pointing device (e.g., a mouse, touch screen), keyboard, microphone, joystick, gamepad, scanner, and the like. For instance, the user can employ input device 320 (for example, but not limited to, the input device 212, as illustrated in FIG. 2) to control one or more features of the systems described herein. These and other input devices 320 can be connected to processing unit 301 through a corresponding port interface 322 that is coupled to the system bus, but may be connected by other interfaces, such as a parallel port, serial port, or universal serial bus (USB). One or more output devices 324 (for example, but not limited to, display, a monitor, printer, projector, or other type of displaying device) can also be connected to system bus 303 via interface 326, such as a video adapter. In some examples, the one or more output devices 324 can include the display 130, as illustrated in FIG. 1 or the display 216, as illustrated in FIG. 2.

Computer system 300 may operate in a networked environment using logical connections to one or more remote computers, such as remote computer 328. Remote computer 328 may be a workstation, computer system, router, peer device, or other common network node, and typically includes many or all the elements described relative to computer system 300. The logical connections, schematically indicated at 330, can include a local area network (LAN) and a wide area network (WAN). When used in a LAN networking environment, computer system 300 can be connected to the local network through a network interface or adapter 332. When used in a WAN networking environment, computer system 300 can include a modem, or can be connected to a communications server on the LAN. The modem, which may be internal or external, can be connected to system bus 303 via an appropriate port interface. In a networked environment, application programs 316 or program data 318 depicted relative to computer system 300, or portions thereof, may be stored in a remote memory storage device 340.

Figure 4:
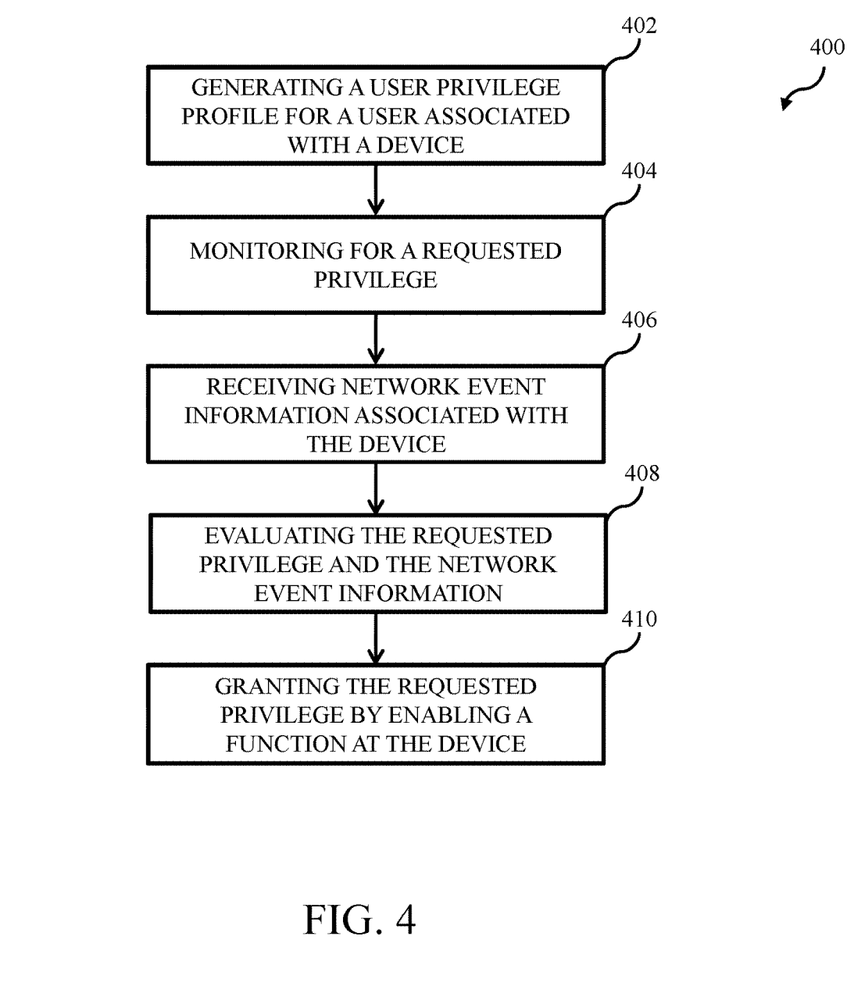
FIG. 4 is a flow diagram illustrating an exemplary method for managing a device.
Figure 5:
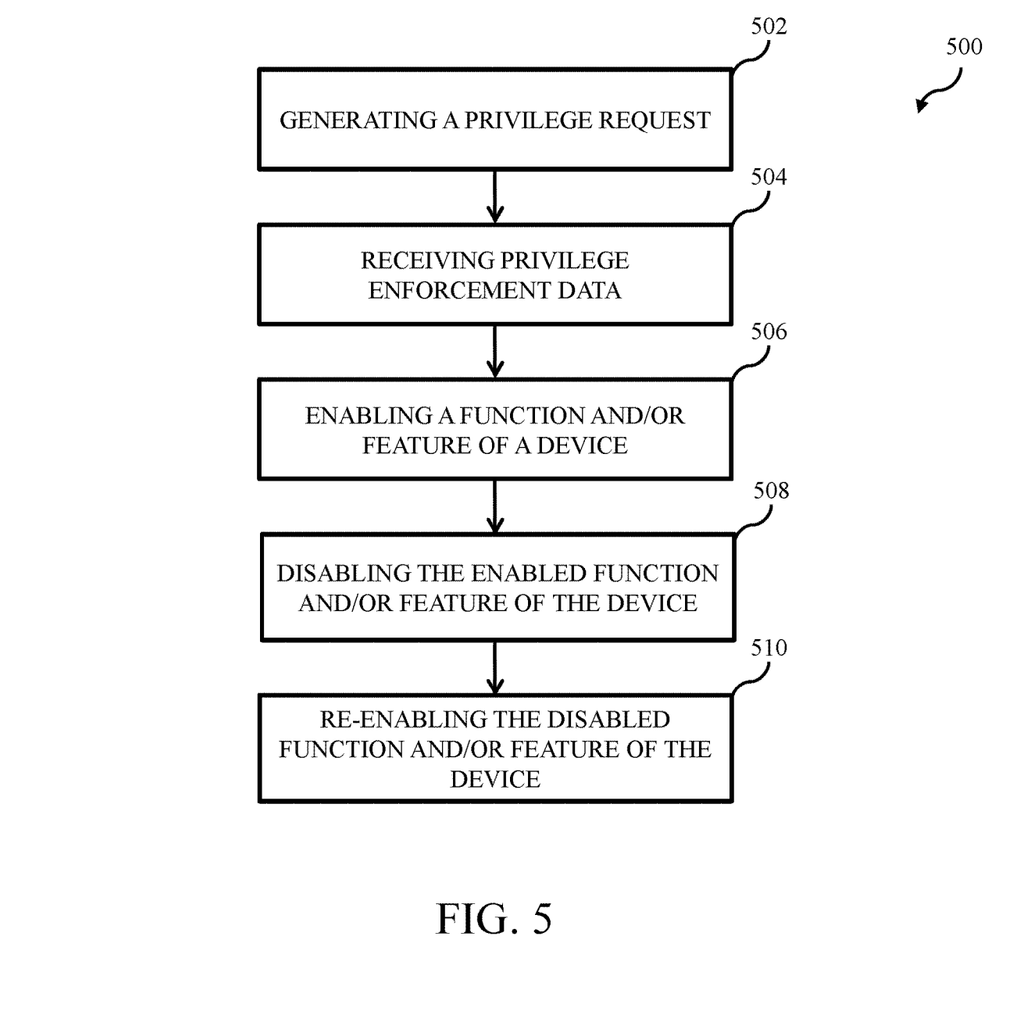
FIG. 5 is a flow diagram illustrating an exemplary method for managing usage of a feature and/or function of a device.
Figure 6:
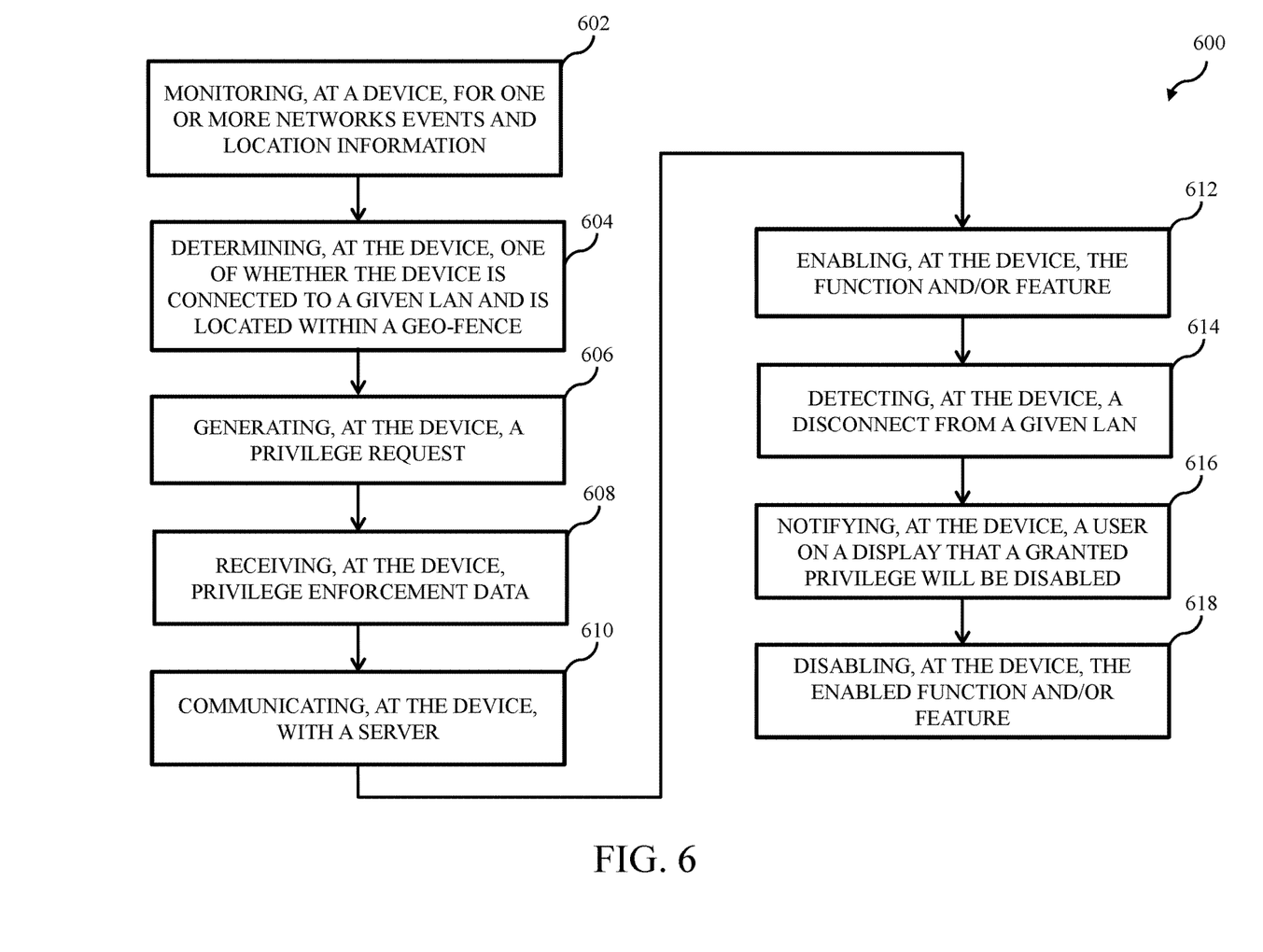
FIG. 6 is a flow diagram illustrating an another exemplary method for managing usage of a feature and/or function of a device.

In view of the foregoing structural and functional features described above, methods that can be implemented will be better appreciated with reference to FIGS. 4-6. While, for purposes of simplicity of explanation, the methods of FIGS. 4-6 are shown and described as executing serially, it is to be understood and appreciated that such methods are not limited by the illustrated order, as some aspects could, in other embodiments, occur in different orders and/or concurrently with other aspects from that shown and described herein. Moreover, not all illustrated features may be required to implement a given method.

FIG. 4 illustrates an example of a flow diagram of an exemplary method 400 for managing a device. In some examples, the method 400 can be implemented on a tool (for example, but not limited to, the tool 102, as illustrated in FIG. 1 and/or the tool 204, as illustrated in FIG. 2). The method 400 can begin at 402 by generating, at a server, a user privilege profile for a user associated with a device (for example, but not limited to, the device 104, as illustrated in FIG. 1 and/or the device 202, as illustrated in FIG. 2). The user privilege profile can include one or more rules. At 404, monitoring, at the server, for a requested privilege generated at the device. The requested privilege can be generated by an application executing on the device based on user input at the device. At 406, receiving, at the server, network event information associated with the device. The network event information can be indicative that the device is connected to a given local area network (LAN). At 408, evaluating, at the server, the requested privilege and the one or more rules of the user privilege profile to determine whether to grant the requested privilege for the user at the device. The evaluation can include determining that the device is connected to the given LAN based on the network event information. At 410, granting, at the server, the requested privilege by enabling a function and/or feature for the user at the device based on the evaluating, the function and/or feature being enabled for the user while the device is connected to the given LAN, and in some examples, further based on one or more rules and/or a given amount of time not elapsing, as described herein. The requested privilege can be revoked by the application to detecting that the device disconnected from the given LAN.

FIG. 5 illustrates an example of a flow diagram of an exemplary method 500 for managing usage of a feature and/or function of a device. In some examples, the method 500 can be implemented on a device (for example, but not limited to, the device 104, as illustrated in FIG. 1 and/or the device 202, as illustrated in FIG. 2). The method 500 can begin at 502 by generating, at the device, a privilege request for enabling of a function and/or feature for a user on the device while the device is connected to a given LAN. At 504, receiving, at the device, privilege enforcement data generated at a server based on the privilege request. The server can be configured to generate the privilege enforcement data based on an evaluation of the privilege request and a user privilege profile associated with the user. The user privilege profile can include one or more rules for controlling one or more functions and/or features of the user device. At 506, enabling, at the device, the function and/or feature on the device for the user based on the privilege enforcement data. At 508, disabling, at the device, the enabled function and/or feature in response to detecting that the device has disconnected from the given LAN. At 510, re-enabling, at the device, the disabled function and/or feature in response to detecting the device re-connecting to the given LAN, and in some examples, further based on one or more rules and/or a given amount of time not elapsing, as described herein.

FIG. 6 illustrates an example of a flow diagram of another exemplary method 600 for managing usage of a feature and/or function of a device. In some examples, the method 600 can be implemented on a device (for example, but not limited to, the device 104, as illustrated in FIG. 1 and/or the device 202, as illustrated in FIG. 2). The method 602 can begin at 602 by monitoring, at a device, for one of one or more network events and location information generated by a location system. In some examples, the location information can include global positioning coordinates (GPS) coordinates. The GPS coordinates can be evaluated relative to geo-fence data to determine whether the device is within a geo-fence. At 604, determining, at the device, one of whether the device is connected to a given LAN and is located within a geo-fence. At 606, generating, at the device, a privilege request for enabling a function and/or feature of the device for the user while one of the device is connected to the given LAN and located within the geo-fence. The device can be configured with an operating system. At 608, receiving, at the device, privilege enforcement data generated at a server based on the privilege request. The server can be configured to generate the privilege enforcement data based on an evaluation of the privilege request and a user privilege profile associated with the user. In some examples, the evaluation can be further based one of the one or more network events and the location information for the user device. The user privilege profile can include one or more rules for controlling one or more functions and/or features of the device.

At 610, communicating, at the device, with the server to confirm one of a connection with the server and that a server-side timer has not expired in response to the user being granted the privilege request. At 612, enabling, at the device, the function and/or feature of the device for the user based on the privilege enforcement data, and further based on one of confirming the connection with the server and that the server-side timer has not expired. At 614, detecting, at the device, a disconnect from the given LAN. At 616, notifying, at the device, the user on a display that a granted privilege will be disabled upon expiration of a local timer in response to detecting the disconnect from the given LAN. At 618, disabling, at the device, the enabled function and/or feature based on the expiration of the local timer, wherein the disabling corresponds to logging-off of the user from the operating system.

What have been described above are examples. It is, of course, not possible to describe every conceivable combination of components or methodologies for purposes of describing the examples of the disclosure described herein, but one of ordinary skill in the art will recognize that many further combinations and permutations of the examples are possible. Accordingly, the examples described herein are intended to embrace all such alterations, modifications and variations that fall within the scope of the appended claims and the application. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, the term "including" means including but not limited to. The term "based on" means based at least in part on.

What is claimed is:
1. A method comprising:
  generating, at a server, a user privilege profile for a user associated with a device, wherein the user privilege profile comprises one or more rules;
  monitoring, at the server, for a requested privilege generated at the device, wherein the requested privilege is generated by an application executing on the device based on user input at the device;
  receiving, at the server, network event information associated with the device, wherein the network event information is indicative that the device is connected to a given local area network (LAN);

evaluating, at the server, the requested privilege and the one or more rules of the user privilege profile to determine whether to grant the requested privilege for the user at the device, wherein the evaluation comprises determining that the device is connected to the given LAN based on the network event information;

granting, at the server, the requested privilege by enabling a function and/or feature for the user at the device based on the evaluating, the function and/or feature being enabled for the user while the device is connected to the given LAN, wherein the requested privilege is revoked by the application in response to detecting that the device disconnected from the given LAN; and detecting, at the server, privilege changes associated with the user privilege profile; and storing, in a memory associated with the server, the privilege changes associated with the user privilege profile in a log.

2. The method of claim 1, wherein the application on the device is programmed to revoke the requested privileged to disable the function based on one of an amount of time that has elapsed since the requested privileged has been granted, a current day and/or time, and a combination thereof.

3. The method of claim 1, wherein the one or more rules comprise one of a usage rule, a location rule, a time-of-day rule, a timer rule, a computer network rule, an access point rule, and a combination thereof, the one or more rules corresponding to the one or more privileges.

4. The method of claim 3,
wherein the device corresponds to a plurality of devices, the user corresponds to a plurality of users, and the user privilege profile corresponds to a plurality of user privilege profiles; and
further comprising identifying, at the server, the user privilege profile from the plurality of user privilege profiles based on the requested privilege, wherein the requested privilege comprises information indicative of one the device, the user, and a combination thereof.

5. The method of claim 1, wherein the granting comprises providing the device with privilege enforcement data, and wherein the device is configured to enable the function and/or feature based on the enforcement data corresponding to enforcing the requested privilege at the device.

6. The method of claim 5, further comprising generating, at the server, privilege notification data indicative that the requested privilege has been enforced at the device in response to the device enforcing the requested privilege.

7. The method of claim 6, further comprising providing, at the server, the privilege notification data to one of the device, another device associated with the user, and a combination thereof.

8. The method of claim 6, further comprising generating, at the server, one of an email comprising the privilege notification data and a short message service (SMS) comprising the privilege notification data to one of the device, another device associated with the user, and a combination thereof.

9. The method of claim 1, wherein the function and/or feature corresponds to one of a request for a file and a request to download the file, the method further comprising retrieving, at the server, the file and notifying the user at the device that the file has been retrieved.

10. The method of claim 1, further comprising:
initiating, at the server, a software timer in response to granting the request privilege at the device, wherein at an instance of time at which the timer is initiated corresponds to a start time for the requested privilege; and
periodically, at the server, validating whether the requested privileged should be disabled at instances of time based on the software timer.

11. The method of claim 10, further comprising causing, at the server, the device to disable the requested request privilege at a given instance of time, wherein the given instance of time corresponds to an end time for the requested privilege, the disabling of the requested privilege corresponding to revoking the requested privilege by the application.

12. The method of claim 1, further comprising communicating, at the server, with the device to confirm that the device is connected to the given LAN in response to granting the requested privilege.

13. The method of claim 1, wherein the given LAN comprise one of one or more virtual local area network (VLANs), one or more WiFi networks, and a combination thereof.

14. The method of claim 1, wherein the application is configured to enable the function in response to detecting the device re-connecting to the given LAN.

* * * * *